United States Patent [19]

Howe

[11] 4,399,599

[45] Aug. 23, 1983

[54] TAG THREADER APPARATUS

[76] Inventor: Lenard R. Howe, 644 W. 400 South, Centerville, Utah 84014

[21] Appl. No.: 281,139

[22] Filed: Jul. 7, 1981

[51] Int. Cl.$^3$ .............................................. B23P 19/04

[52] U.S. Cl. .......................................... 29/241; 29/433

[58] Field of Search ........................... 29/241, 433, 33; 83/467, 451; 30/358, 363, 368, 124, 130, 131

[56] References Cited

U.S. PATENT DOCUMENTS

| | | | |
|---|---|---|---|
| 2,624,940 | 1/1953 | Osborne et al. | 30/131 |
| 2,978,800 | 4/1961 | Blain | 29/241 |
| 4,036,088 | 7/1977 | Ruskin | 83/467 |

*Primary Examiner*—James L. Jones, Jr.
*Assistant Examiner*—Steven P. Schad
*Attorney, Agent, or Firm*—Donald J. Singer; John R. Flanagan

[57] ABSTRACT

A tag threader apparatus includes a flat base and a spring-biased first class lever pivotally mounted on the bottom side of the base. A pad on one end of the lever may be depressed for pivoting the lever and reciprocating a string threading plunger, pivotally connected to the other end of the lever, through a guide on the bottom side of the base and a central portion of a string guiding groove in the base. The string to be inserted is received along the groove and is carried by an upper free end of the plunger through a hole in a tag positioned on the base. Overhanging ledge structures on the base guide and restrain the tag at a desired position on the base in which its hole is aligned with the plunger. Once the string has been pushed through the tag hole, it may be grasped as the tag is removed from the base.

8 Claims, 9 Drawing Figures

TAG THREADER APPARATUS

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to threading a tag or the like with string and, more particularly, is concerned with an apparatus for mechanically threading string through the hole in the tag.

2. Description of the Prior Art

Tags are used in various types of warehouse, repair and manufacturing facilities to identify equipment and supplies. For instance, at one facility a process called "decanning" involves taking materials out of packages, identifying them by tying tags to the materials and then further processing the materials.

However, manually inserting strings into the tags and cutting the strings to the desired length soon becomes a tedious, nerve-racking task. Furthermore, it is a time-wasting activity when reinforced tags are used which have tape or other adhesive strips applied to them over the holes through which the strings must be inserted. The tape must first be stripped away or punctured at the hole area before the string can be threaded through the hole.

Consequently, a need exists for a technique to mechanize the tag threading operation to reduce stresses on personnel who heretofore had to manually thread the tags with string.

SUMMARY OF THE INVENTION

The present invention meets the aforementioned need by providing a mechanical technique which eliminates manually threading of tags with strings and also punctures obstructing plastic tape or the like which may be covering the tag hole. Thus, the present invention not only lessens the often nerve-racking job of threading tags manually, it also is a time-saving device. It also includes a feature for cutting the desired length of string without guessing or waste. The apparatus can be mounted on a workbench, table or other rigid support structure. Standard inspection tags and string are used in the apparatus.

Accordingly, the present invention provides a tag threader which comprises: (a) a flat base; (b) a string guiding groove defined in the base across one end thereof for receiving a strand of string and having a central portion which opens at a first side of the base; (c) a plunger guide attached to a second side of the base opposite the first side thereof and having an opening which interacts with the central portion of the string guiding groove; (d) a plunger movably mounted within the plunger guide such that a free end of the plunger is extendible through and retractible from the opening of the guide and the central portion of the groove to correspondingly above and below the first side of the base; (e) means biasing the plunger toward a first position in which the free end thereof is retracted below the first side of the base for allowing a tag to be positioned on the first side with a hole in the tag aligned with the central portion of the groove; and (f) a lever pivotally mounted on the second side of the base and pivotally connected to the plunger, the lever being actuatable so as to move the plunger against the biasing means to a second position in which the free end of the plunger is extended above the first side of the base and through the hole of the tag and has threaded therethrough a portion of the strand of string from the string guiding groove. The free end of the plunger has a bifurcated structure for carrying the strand of string and also piercing any tape covering the hole of the tag.

The tag threader apparatus further includes means mounted on the first side of the base for guiding the tag into a position on the first side in which the hole in the tag is aligned with the plunger guide opening and the central portion of the string guiding groove and for restraining the tag in such position as the lever is actuated to extend the plunger free end through the hole in the tag. Also, a lateral portion of the string guiding groove extending from the central portion of the groove to an edge of the base is open at the first side of the base for facilitating re-insertion therein of the strand of string extending from the central groove opening after the threading of a tag and severing of the threaded string, but prior to the positioning of the next succeeding tag on the first side of the base.

DETAILED DESCRIPTION OF THE INVENTION

Figure 1:
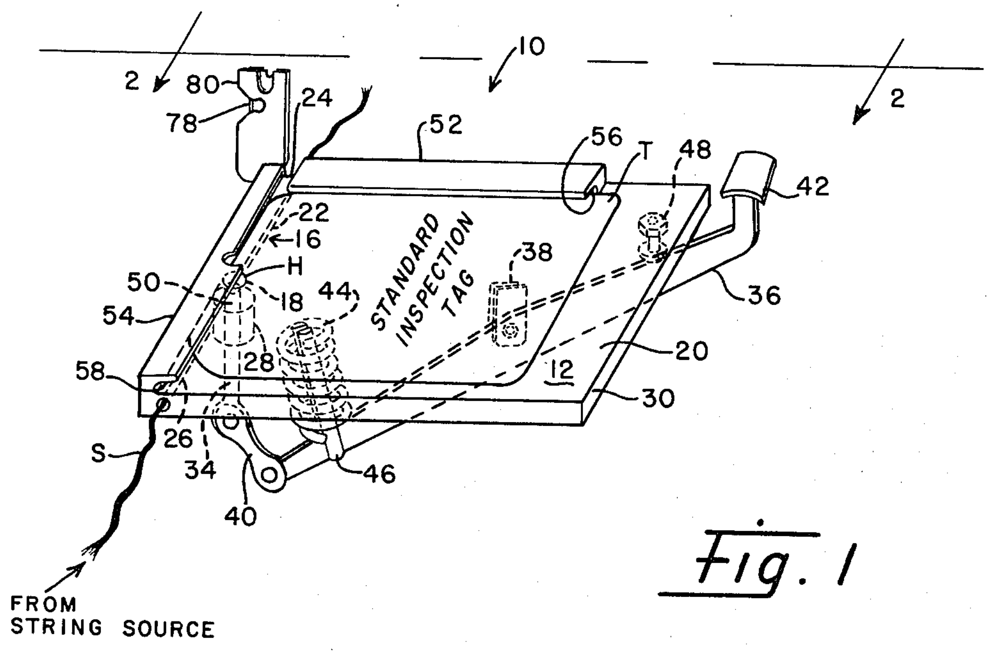
FIG. 1 is a perspective view of the tag threader apparatus of the present invention.
Figure 2:
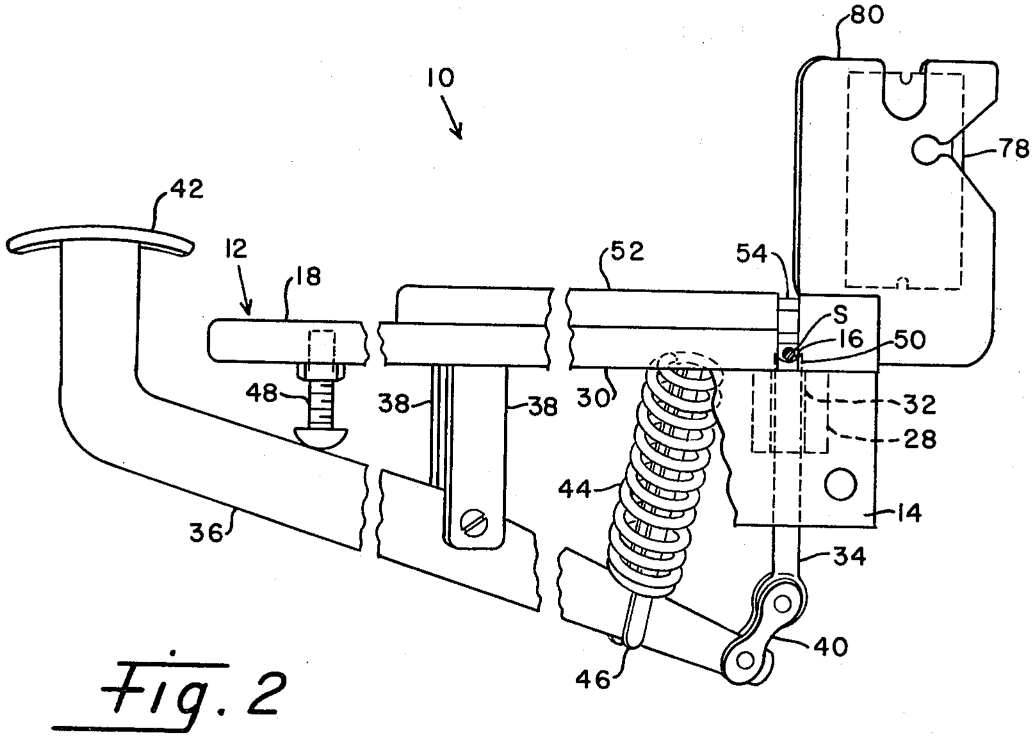
FIG. 2 is an enlarged fragmentary side elevational view of the apparatus as seen along line 2—2 of FIG. 1.
Figure 6:
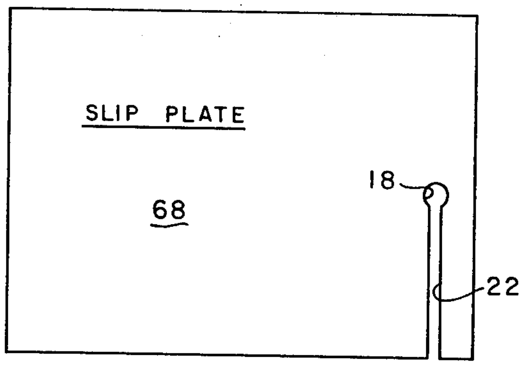
FIGS. 4 through 8 illustrate the various layers comprising the laminations of the base.

Referring now to the drawings, and more particularly to FIGS. 1 and 2, there is shown the preferred embodiment of the tag threader apparatus of the present invention, being generally designated 10. The tag threader apparatus 10 includes a flat base 12 having a flange 14 for mounting the apparatus on a rigid support structure, such as a workbench, table or the like. A string guiding groove 16 is defined in the base 12 across one end of the base and receives a strand of string S. The groove 16 has a central portion 18 which opens at a top side 20 of the base 12, with the groove 16 itself being defined in the base 12 below the level of the top side 20 thereof. The groove 16 also has a lateral portion 22 which extends from the central portion 18 to an edge 24 of the base and is open to the top side of the base. The other lateral portion 26 of the groove is not exposed at the top side of the base. The reason for this particular construction of the groove 16 will become apparent later on. The base 12 also has a plunger guide 28 attached to a bottom side 30 thereof. The plunger guide 28 has an opening 32 which intersects with the central portion 18 of the string guiding groove 16. It is readily apparent in FIGS. 1, 2 and 5 that the groove 16 is dimensioned to limit or confine the strand of string S to a path along which the strand will always extend across the central portion 18 of the groove 16.

For threading a tag T positioned on the top side 20 of the base 12, a string threading plunger 34 is mounted for reciprocatory movement within the plunger guide 28 through actuation of a first class lever 36 which is pivotally mounted below the bottom side 30 of the base. The lever 36 is pivotally mounted intermediate its opposite ends to the base by a pair of spaced apart tabs 38 which are rigidly connected to and extend from the bottom side of the base. The forward end of the lever 36 is pivotally connected to the lower end of the plunger 34 by a link 40, while the rear end of the lever mounts a pad 42. A spring 44 encircles a pair of spaced apart rods 46 which are fixed to and extend from the bottom side 30 of the base 12. The lever 36 extends through the space between the spring guide rods 46 and moves along the rods within this space during its pivotal movement. An adjustable stop 48 is threaded into the bottom side of the base above the lever near the end thereof which mounts the pad 42. The stop 48 limits the downward pivotal stroke of the lever at its end which is connected to the plunger so that the lever will remain between the spring guide rods 46 when at its lower limit, such as is seen in FIG. 2. In such manner, the spring 44 is confined between the top edge of the lever 36 and the bottom side 30 of the base 12.

As the string threading plunger 34 is moved upward and downward by the lever 36, a free upper end 50 of the plunger is extendible through and retractible from the opening 32 of the guide 28 and the central portion 18 of the string guiding groove 16 to correspondingly above and below the top side 20 of the base 12. The free end 50 of the plunger has a bifurcated structure forming a recess 51 and a pair of upwardly projecting pointed edges 53 extending above and spaced apart by the recess 51, as seen in FIG. 2 with the recess 51, for carrying the string S in it and with the pointed edges 53 capable of directly engaging and piercing any readily tearable or like which may be covering the hole H of the tag T without engaging and severing the string S carried in the recess 51. The spring 44 biases the lever 36 and thereby the plunger 34 toward a first position, as seen in both FIGS. 1 and 2, in which the free end 50 of the plunger is retracted below the top side 20 of the base 12 for allowing the tag T to be inserted into a desired position on the top side with the hole H in the tag aligned with the central portion 18 of the groove 16. Then when the lever 36 is actuated by pressing down on its pad 42, it moves the plunger 34 against the biasing of the spring 44 to a second position (not shown) in which the free end 50 of the plunger 34 is extended above the top side 20 of the base 12 and through the hole H of the tag T. In such position, a portion of the strand of string S from the string guiding groove has been threaded through the hole of the tag.

For guiding the insertion of the tag T to the desired position on the base 12 and restraining it at that position during threading with string, means in the form of overhanging ledges 52 and 54 are fixed to the top side 20 of the base 12 along the front and right marginal edges thereof. The positions of guideways 56, 58 defined by ledges 52, 54 and the position of the central portion 18 of the string guiding grooves 16 are coordinated to align the hole H in a leading edge of the tag T with the central portion of the groove with the leading edge of the tag overlying the groove when the tag is inserted along guideway 58 and abutted into guide way 56. The ledges 52, 54 restrain upward movement of the tag as the plunger threads string through the hole of the tag from its underside. Also, such restraint assists the plunger in piercing any tape covering the hole of the tag.

Figure 3:
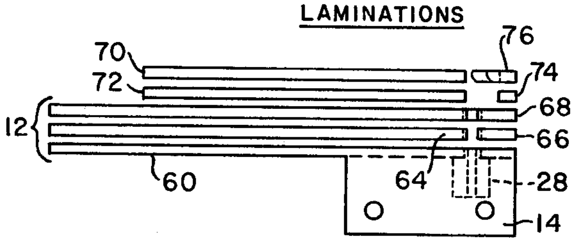
FIG. 3 is an exploded view of the laminated construction of the base of the apparatus of FIG. 1.

Construction of the base 12 is facilitated by assembling together, in the order seen in FIG. 3, a number of individual plates and strips, as individually illustrated in FIGS. 4 through 8. The base plate 60 of the base 12 illustrated in FIG. 4 has the mounting flange 14 and plunger guide 28 attached thereto as well as a threaded hole 62 for receiving the adjustable stop 48. As seen in FIG. 3, the base plate 60 is the bottom one of the stack of plates comprising the flat base 12.

Figure 7:
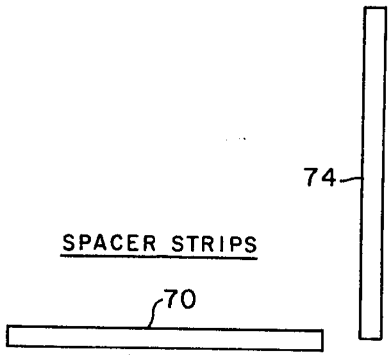
Figure 5:
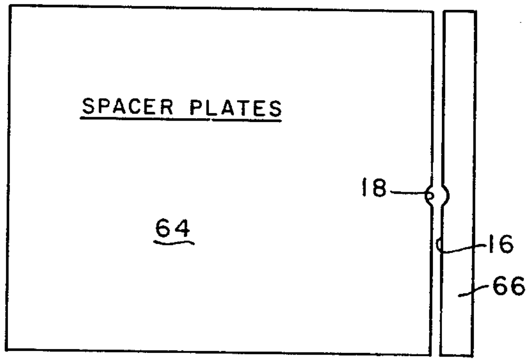
Figure 8:
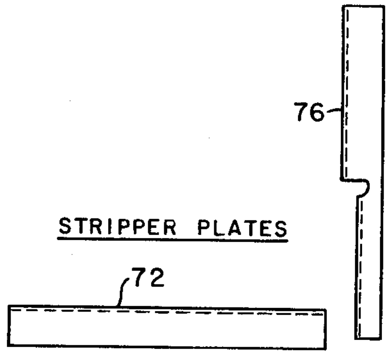
Figure 4:
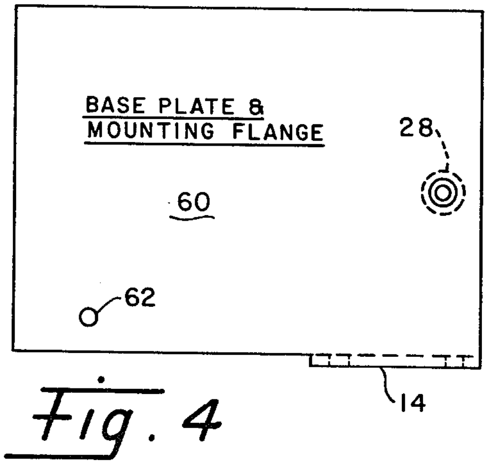
Figure 9:
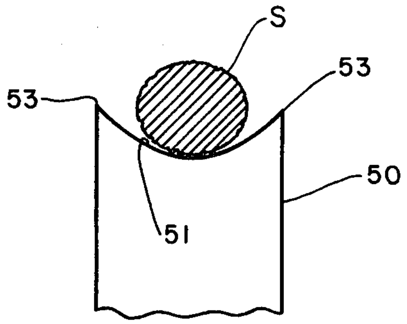
FIG. 9 is an enlarged fragmentary side elevational view of the upper end of the plunger shown in FIG. 2.

Large and narrow spacer plates 64, 66 of FIG. 5 comprise the intermediate plate of the base 12, as seen in FIG. 3. The entire length of string guiding groove 16 and the central portion 18 thereof are defined between them. A slip plate 68 shown in FIG. 6, and forming the top plate of the base 12 as seen in FIG. 3, also defines the central portion 18 of the groove 16 as well as the lateral portion 22 thereof. Also, it can be readily understood from comparing the relative sizes of the respective openings in plunger guide 28 and slip plate 68, as shown in FIG. 3, that sufficient clearance is present between the free end 50 of the plunger, as it reciprocates in the opening of the guide 28, and the part of the slip plate 68 defining the central portion 18 of the groove 16 to allow passage of the string with the plunger free end 50 upwardly through central portion 18 past the plate 68 without severing the string S. Finally, the components of the ledges 52, 54 are shown in FIGS. 7 and 9. The spacer strip 70 and stripper plate 72 form side ledge 52 and guideway 56 on the base 12, while the spacer strip 74 and stripper plate 76 form the end ledge 54 and guideway 58 thereon.

For facilitating ease of severing the string after being threaded into the tag T, a razor blade 78 inserted in holder 80 fixed to a corner of the base 12, as seen in FIGS. 1 and 2, may be used.

The operation of the tag threader apparatus 10 may be summarized as follows. A standard tag is inserted into the guideways 56, 58 of the overhanging ledges 52, 54 on the base 12 which automatically aligns the tag hole H with the free end 50 of the plunger 34. A strand of string S is already inserted through the groove 16, as seen in FIG. 1. By pressing downward on pad 42, the lever 36 is pivoted so as to raise the plunger 34 and extend its free end 50 through the tag hole H, pushing a portion of the strand of string through the hole with it. When the lever 36 is released, due to the force of the spring 44 it pivots back to its initial position withdrawing or retracting the plunger from the tag hole, but leaving the string protruding from the hole for easy grasp by the operator's fingers. The string and tag are removed and the string is cut to the desired length on the razor blade 78. The free end of the strand of string that is still threaded through the closed lateral portion 26 of the groove 16 and extends from central portion 18 is dropped into the open lateral portion 22 of the groove before the next tag is applied to the base 12. The string is supplied from some suitable source such as a ball or reel.

Inasmuch as tags of varying size are commonly used, a different size apparatus can be built to conform to the different size tags available. Alternatively, the overhanging ledges could be made slideable for adjusting the positions of their guideways relative to the central portion of the groove so as to accommodate tags of various sizes.

It is thought that the tag threader apparatus of the present invention and may of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. Tag threader apparatus, comprising:

a. a flat base having opposite first and second sides;

b. a string guiding groove defined in said base across one end and below the lever of said first side thereof for receiving a strand of string and having a central portion which opens at said first side of said base, said groove being dimensioned to confine the strand of string to a path along which the strand will always extend across said central portion of said groove;

c. a plunger guide attached to said second side of said base opposite said first side thereof and having an opening which intersects with said central portion of said string guiding groove and the strand of string confined therein;

d. a plunger movably mounted within said plunger guide such that a free end of said plunger is extendible through and retractible from said opening of said guide and said central portion of said groove for contact with the strand of string and movement above and below said first side of said base with sufficient clearance being present between said free end of said plunger and said central portion of said groove to allow passage of a portion of the strand of string with said plunger free end through said central portion of said groove and above said first side of said base without severing the strand of string;

e. means biasing said plunger toward a first position in which said free end thereof is retracted below said first side of said base for allowing a tag to be positioned on said first side with a leading edge of said tag overlying said groove in said base and a hole in the leading edge of said tag aligned with said central portion of said groove; and f. a lever pivotally mounted on said second side of said base and pivotally connected to said plunger, said lever being actuatable so as to move said plunger against said biasing means to a second position in which said free end of said plunger and the portion of the strand of string therewith extend above said first side of said base and through the hole of the tag, threading therethrough the portion of the strand of string from said string guiding groove.

2. The tag threader apparatus as recited in claim 1, further comprising:

means mounted on said first side of said base for guiding the tag into a position on said first side in which said leading edge of said tag overlies said groove and the hole in said leading edge of the tag is aligned with said plunger guide opening and said central portion of said string guiding groove and for restraining the tag in such position as said lever is actuated to extend said plunger free end through the hole in the tag.

3. The tag threader apparatus as recited in claim 1, wherein said means for biasing said plunger toward said first position is a spring disposed between said lever and said second side of said base.

4. The tag threader apparatus as recited in claim 1 wherein said lever is of the first class type with one of its opposite ends being pivotally connected to said plunger and the other of its opposite ends supporting a pad which is manually depressed when actuating said lever.

5. The tag threader apparatus as recited in claim 1 wherein said free end of said plunger has a bifurcated structure forming a recess for carrying the strand of string and a pair of upwardly projecting pointed edges extending above and spaced apart by said recess for engaging and piercing any readily tearable tape covering the hole of the tag without engaging and severing the strand of string carried in the recess.

6. The tag threader apparatus as recited in claim 1, further comprising:

means mounted on said base for use in cutting the strand of string.

7. The tag threader apparatus as recited in claim 1, wherein a lateral portion of said string guiding groove extending from said central portion of said groove to an edge of said base is open at said first side of said base for facilitating re-insertion therein of the strand of string extending from said central groove opening after the threading of a tag and prior to the positioning of the next succeeding tag on said first side of said base.

8. Tag threader apparatus, comprising:

a. a flat base which may be detachably mounted to a rigid support structure, said base having top and bottom sides;

b. a string guiding groove defined in said base across one end and below the level of said top side thereof for receiving a strand of string and having a central portion which opens at said top side of said base, said groove being dimensioned to confine the strand of string to a path along which the strand will always extend across said central portion of said groove;

c. a plunger guide attached to said bottom side of said base and having an opening which intersects with said central portion of said string guiding groove and the strand of string confined therein;

d. a string threading plunger mounted for reciprocatory movement within said plunger guide such that a free end of said plunger is extendible through and retractible from said opening of said guide and said central portion of said groove for contact with the strand of string and reciprocable movement above and below said top side of said base with sufficient clearance being present between said free end of said plunger and said central portion of said groove to allow passage of a portion of the strand of string with said plunger free end through said central portion of said groove and above said top side of said base without severing the strand of string;

e. a lever of the first class type pivotally mounted on the bottom side of said base with a pad on one end thereof and said plunger being pivotally connected to the other end thereof;

f. spring means disposed between said lever and said bottom side of said base for biasing said lever and thereby said plunger toward a first position in which said free end thereof is retracted below said top side of said base for allowing a tag to be positioned on said top side with a leading edge of the tag overlying the groove and a hole in the leading edge of the tag aligned with said central portion of said groove;

g. said lever being actuable by pressing down on said pad so as to move said plunger against said biasing spring means to a second position in which said free end of said plunger and the portion of the strand of string therewith extend above said top side of said base and through the hole of the tag, threading therethrough the portion of the strand of string from said string guiding groove, said free end of said plunger having a bifurcated structure forming a recess for carrying the portion of the strand of string and a pair of upwardly projecting pointed edges extending above and spaced apart by said recess for engaging and piercing any readily tearable tape or the like covering the hole of the tag without engaging and severing the strand of string carried in the recess; and h. means mounted on said top side of said base for guiding the tag to, and restraining the tag at, the position on said top side of said base in which the leading edge of the tag overlies the groove and the hole in the leading edge of the tag is aligned with said central portion of said string guiding groove for facilitating threading of the strand of string through the hole of the tag and simultaneously piercing any readily tearable tape covering the tag hole.

* * * * *

UNITED STATES PATENT AND TRADEMARK OFFICE
CERTIFICATE OF CORRECTION

PATENT NO. : 4,399,599

DATED : August 23, 1983

INVENTOR(S) : Lenard R. Howe

It is certified that error appears in the above—identified patent and that said Letters Patent is hereby corrected as shown below:

Col. 3, line 35, after "tearable" insert --- tape ---.

Col. 4, line 28, delete "9" and insert --- 8 ---.

Col. 5, line 11 (claim 1, line 4), delete "lever" and insert --- level ---.

Signed and Sealed this

*Twenty-second* Day of *November 1983*

[SEAL]

*Attest:*

GERALD J. MOSSINGHOFF

*Attesting Officer* *Commissioner of Patents and Trademarks*